UNITED STATES PATENT OFFICE.

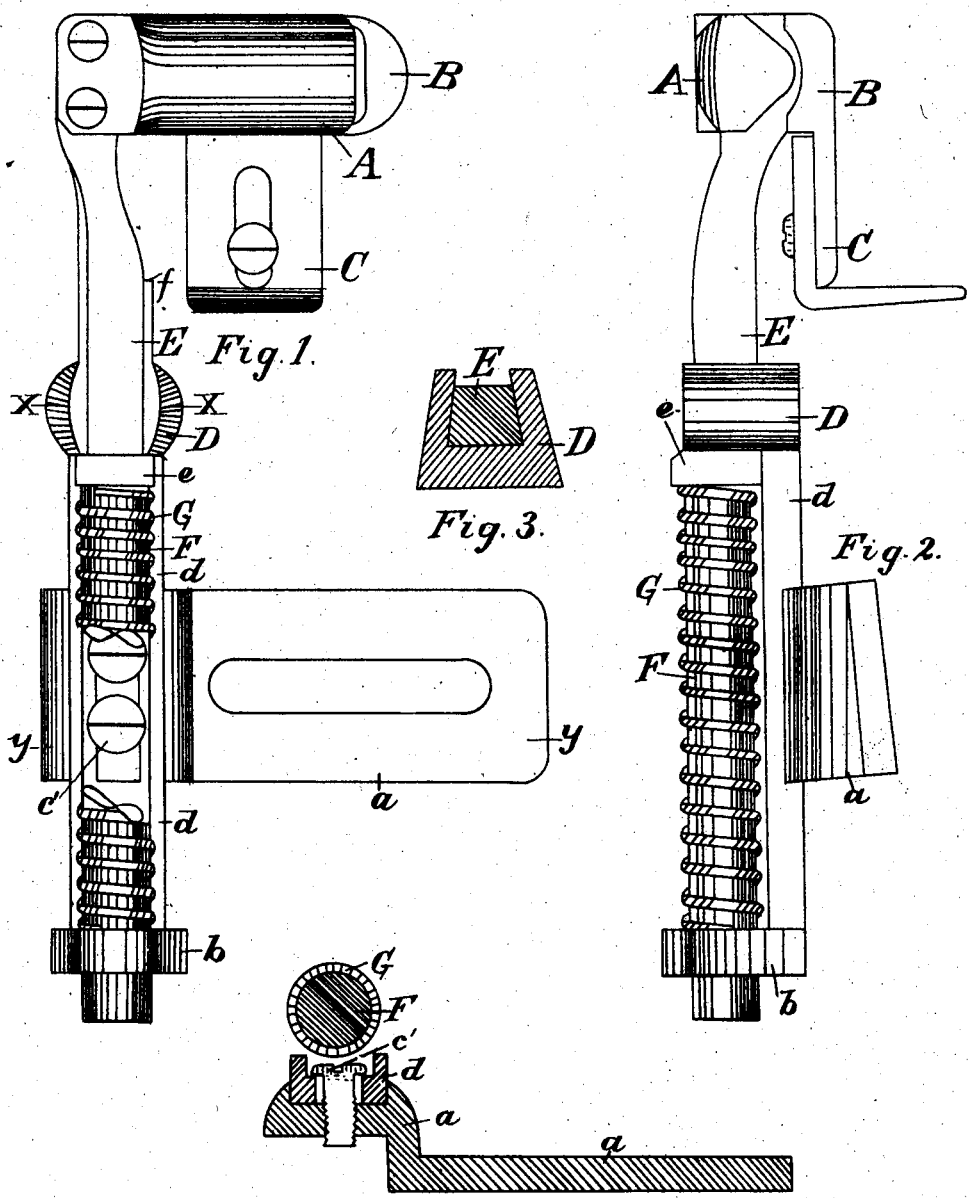

WILLIAM J. COLBERT AND JOHN J. HONAN, OF FALL RIVER, MASSACHUSETTS; SAID HONAN ASSIGNOR TO SAID COLBERT.

TEMPLE FOR LOOMS.

No. 835,011.      Specification of Letters Patent.      Patented Nov. 6, 1906.

Application filed March 12, 1904. Serial No. 197,896.

*To all whom it may concern:*

Be it known that we, WILLIAM J. COLBERT and JOHN J. HONAN, citizens of the United States, residing at Fall River, in the county of Bristol and State of Massachusetts, have invented certain new and useful Improvements in Temples for Looms, of which the following is a specification.

Our invention relates to improvements in temples for looms; and the objects of our improvement are, first, to render the temple stronger and more rigid; second, to render the temple less costly of production; third, to allow a greater width of cloth between temples when on the loom; and, fourth, to make the temple more simple, so that it can be taken off and put on by the ordinary weaver. We attain these objects by mechanism illustrated in the accompanying drawings, in which—

Figure 1 is the top or plan view of the whole temple. Fig. 2 is a vertical view of the whole temple. Fig. 3 is a sectional view of the stand and shank on the plane *x x*. Fig. 4 is a sectional view of the plate and shank at the point *y y* where the stand is fastened to the plate.

Similar letters refer to similar parts throughout the several views.

A represents the cap; B, the pod; C, the heel; *f* E *e* F, the shank; D *d b*, the stand; *a*, the plate; G, the spiral spring; *c'*, the screws by which the stand is fastened to the plate.

The pod, heel, plate, and spring are the same as those in common use.

The shank *f* E *e* F is one solid casting, which below the collar *e* is rounded. Above collar *e* it is wedge-shaped to the point *f*, whence to the end it is substantially square and tapering. The stand D *d b* is a slotted plate having a collar with a circular hole to admit the rounded shank at the point *b*, and at the point D there are two projections to the front, the space between which is a complement of the wedge-shaped shank, which is dovetailed tightly into the stand at this place. The stand is slotted, so that it may be fastened with screws to the plate, which is attached to the breast-beam of the loom.

The shank is dovetailed into the stand and is therefore held securely and rigidly without the use of screws or lag-bolts, which weakened the temple because of the necessity of holes and because screws and bolts wear away readily with the jar of the loom.

The dovetailing of the shank into the stand renders the temple solid, so that there is no play between the different parts, and the cloth is not thrown out of line, causing breakages of yarn and cutting into the race-board.

Our temples are easily taken apart without removing the stand from the loom by simply pushing the shank down into the stand until the point *f* reaches the point formerly occupied by *e*, when the shank will come right out of the stand, and thus prevent the temple from obstructing the weaver in his work, as the ordinary temple now does.

Our temple will be less costly of production, because it is nothing but plain casting, without any holes to drill and tap, and little or no filing or finish is necessary.

Our temple is fastened to the plate by screws through the slot beneath the spiral spring, as is shown in the drawings. By this we accomplish two objects. First, in the ordinary temple a width of three-quarters of an inch is allowed on the inside of the temple for a slot through which to fasten the stand to the plate. By having the slot in the center of the stand beneath the spring the stand is not necessarily so wide, and a greater width of cloth can be run between the temples. Second, in the ordinary temple, with the slot on the side, the slot must be on the inside—*i. e.*, on the side toward the center of the loom—and this makes necessary the manufacture of right and left temples. With the slot in the center of the stand, as in our temple, the same stand may be used either right or left.

What we claim as our invention, and desire to secure by Letters Patent, is—

1. In a loom-temple, a temple-stand having upturned ears converging toward their free ends forming a wedge-shaped recess, a yielding shank carrying the temple-rolls and having a wedge-shaped section fitting in the wedge-shaped recess between said ears, and a reduced portion beyond the wedge-shaped section for permitting the removal of the shank from the stand.

2. In a loom-temple, a yielding shank, carrying the temple-rolls, and a collar, above which the shank is wedge-shaped and having a reduced portion beyond the wedge-shaped section, and a stand, having upturned ears converging toward their free ends, and forming a wedge-shaped recess between said ears to receive the wedge-shaped section of the shank.

In testimony whereof we have affixed our signatures in presence of two witnesses.

WILLIAM J. COLBERT.
JOHN J. HONAN.

Witnesses:
 HENRY F. NICKERSON,
 ADELAID HADEAID.